(12) United States Patent
Mossakowski

(10) Patent No.: US 7,212,662 B2
(45) Date of Patent: May 1, 2007

(54) METHOD FOR THE COMPRESSED TRANSMISSION OF IMAGE DATA FOR 3-DIMENSIONAL REPRESENTATION OF SCENES AND OBJECTS

(75) Inventor: Gerd Mossakowski, Ahlen (DE)

(73) Assignee: T-Mobile Deutschland GmbH, Bonn (DE)

( * ) Notice: Subject to any disclaimer, the term of this patent is extended or adjusted under 35 U.S.C. 154(b) by 0 days.

(21) Appl. No.: 10/547,297

(22) PCT Filed: Feb. 27, 2004

(86) PCT No.: PCT/DE2004/000380

§ 371 (c)(1),
(2), (4) Date: Jun. 27, 2006

(87) PCT Pub. No.: WO2004/077838

PCT Pub. Date: Sep. 10, 2004

(65) Prior Publication Data

US 2006/0274951 A1 Dec. 7, 2006

(30) Foreign Application Priority Data

Feb. 27, 2003 (DE) ................................ 103 08 810

(51) Int. Cl.
*G06K 9/00* (2006.01)
*G06K 9/36* (2006.01)

(52) U.S. Cl. ................. 382/154; 382/232; 375/240.01; 348/387.1

(58) Field of Classification Search ................. 382/154, 382/232, 234, 239; 345/419–427, 55; 356/12, 356/21, 22; 375/240.01, 240.02, 240.08, 375/240.21; 348/42, 404.1, 384.1, 387.1, 348/388.1, 390.1; 708/203; 358/426.01, 358/426.02, 426.07, 426.08, 426.12, 426.15, 358/426.16

See application file for complete search history.

(56) References Cited

U.S. PATENT DOCUMENTS

| | | | |
|---|---|---|---|
| 4,884,131 A * | 11/1989 | Chevion et al. ............... | 348/43 |
| 5,864,640 A | 1/1999 | Miramonti et al. | |
| 6,055,274 A | 4/2000 | McVeigh | |
| 6,191,808 B1 | 2/2001 | Katayama et al. | |
| 6,441,844 B1 | 8/2002 | Tatsuzawa | |
| 6,782,132 B1 * | 8/2004 | Fogg ............................ | 382/232 |
| 7,006,097 B2 * | 2/2006 | Jang et al. .................... | 345/474 |
| 2001/0019630 A1 * | 9/2001 | Johnson ........................ | 382/232 |
| 2002/0159628 A1 | 10/2002 | Matusik et al. | |
| 2004/0170330 A1 * | 9/2004 | Fogg ............................ | 382/232 |

FOREIGN PATENT DOCUMENTS

| | | |
|---|---|---|
| DE | 692 26 825 T2 | 3/1994 |
| DE | 693 24 538 T2 | 3/1994 |
| DE | 195 41 457 C1 | 7/1997 |
| DE | 101 13 880 A1 | 10/2002 |
| DE | 102 31 286 A1 | 2/2004 |
| EP | 0 588 410 A1 | 3/1994 |
| EP | 0705 027 A2 | 4/1996 |
| WO | WO 95/17073 | 6/1995 |
| WO | WO 97/07635 | 2/1997 |
| WO | WO 97/10675 | 3/1997 |

OTHER PUBLICATIONS

Simon, S; "Generalized Run-Length Coding for SNR-scalable Image Compression"; XP008007229; European Association for Signal Processing; Sep. 13, 1994, pp. 560-563.

Forman, M. et al; "Compression of Integral 3D TV pictures"; XP 00061345; International Conference on Image Processing and its Applications, pp. 584-588, London.

Marshall, S. et al; "Application of image contours to three aspects of image processing: compression, shape recognition and stereopsis"; XP000292350; IEE Proceedings-1, vol. 139; No. 1; pp. 1-8; Feb. 1992.

* cited by examiner

Primary Examiner—Samir Ahmed
(74) Attorney, Agent, or Firm—Browdy and Neimark, PLLC

(57) ABSTRACT

The invention relates to a method for the compressed transmission of image data for a three-dimensional representation of scenes and objects. A known method for transmitting video data between an emitter and a receiver according to the method for prioritised pixel transmission, can be advantageously used for transmitting and processing three-dimensional objects and scenes, or the corresponding additional data in that each scene/object is taken from at least two perspectives, one perspective being associated with the actual image array and the at least one other perspective being associated with an offset region of the image array. A larger number of pixel groups are transmitted from the actual image array than from the offset region, the pixels of the missing pixel groups of the offset region being calculated from the already transmitted pixel groups of the image array.

5 Claims, No Drawings

METHOD FOR THE COMPRESSED TRANSMISSION OF IMAGE DATA FOR 3-DIMENSIONAL REPRESENTATION OF SCENES AND OBJECTS

The present invention relates to a method for the compressed transmission of image data for a 3-dimensional representation of scenes and objects.

German patent application No. 102 31 286.9 describes a method for transmitting additional data within a video data transmission between a sender and a receiver according to the method of the prioritized pixel transmission, wherein the video data consists of individual pixel groups and each pixel group has a position value within an image array and at least one pixel value. The minimum size of the image array is defined by the height h and width b of a video image, given in pixels. During the transmission of the additional data, position values are used that do not occur in the actual video data but are associated with an offset region of the image array. The actual transmission of the image data is based on a method for compressing and decompressing image and video data by means of prioritizing pixel groups, as it is described in printed publication DE 101 13 880 A1, whose entire disclosure is incorporated as a reference into the present application.

Essentially, two different methods are known for transmitting 3-dimensional scenes and objects. One on hand it is known to record a scene or an object from different camera perspectives and to transmit these data in the other method, the objects or scenes are modeled with the aid of grid models and saved or transmitted. The grids then form the envelope of the individual objects or scenes. The position of the grids in the 3-dimensional space is determined by grid points. The surface areas between the grid points are filled in with textures, which are usually transmitted separately from the grid structure. This method is used mainly in the field of computer games, in which artificial objects are generated with the aid of the computer. The advantage lies in the fact that it is possible to represent the objects/scenes under different circumstances (e.g., angle of view, illumination with different types of lighting). In the case of natural objects (e.g., real people, plants), however, it is not yet possible at the present time to convert them to a corresponding grid model in real time.

For this reason a transmission according to the first method with the aid of different camera perspectives is generally performed nowadays for recordings of natural images. Humans can see three-dimensionally by taking in a scene with both eyes at the same time. In the process the eyes perceive the same scene slightly differently. From these different perceptions the human brain generates a three-dimensional image. This fact is utilized also by 3D movies, among other things, in such a way that, when viewing them, a-person is presented with a (slightly) different image in their left and right eye. Practical embodiments are eye glasses, for example, which [can filter out/by filtering out]* either the color (red/green) or the polarization of the light (horizontal/vertical) [Translator's note: missing verb/omitted text] corresponding images for the left and right eye. The images to be transmitted for the eyes, as a general rule, are only minimally different. Especially in the case of object edges this difference becomes noticeable. This fact that can be utilized in the presented transmission process. For purposes of simplicity, the image information received by the left eye will be referred to below as image 1, and the image information seen by the right eye will be referred to as image 2.

*Translators note: The intended meaning is not clear in the German document. It appears that the German-language sentence is missing a verb.

It is the object of the invention to further develop the method known from German patent application No. 102 31 286.9 for transmitting additional data within a transmission of video data between a sender and a receiver according to the method of the prioritized pixel transmission in such a way that a transmission of 3-dimensional objects and scenes becomes possible over narrow-band transmission systems, e.g., GSM/UMTS.

This object is met according to the invention with the characteristics of claim 1.

The method that is described in said patent application can be advantageously used for transmitting and processing 3-dimensional objects and scenes in such a way that each scene/each object is recorded from at least two perspectives, one perspective being associated with the actual image array and the at least one other perspective being associated with an offset region of the image array. A larger number of pixel groups are transmitted from the image array than from the offset region, the pixels of the missing pixel groups of the offset region being calculated from the already transmitted pixel groups of the image array.

For the perspective transmitted in the image array, pixel groups with a higher priority as well as pixel groups with a lower priority are preferably transmitted both, and for the perspective transmitted in the offset region only pixel groups with a higher priority are transmitted.

A simple example embodiment of the invention will be explained below.

A scene is recorded by at least two cameras. One camera is used as the master camera. This camera could be the overview camera described in the main patent and defined, for example, as image 1. The master camera would now fill a first image area (pixels 0 . . . 512). During the transmission not only higher prioritized pixel groups would be transmitted, but also low prioritized pixel groups, in order to obtain an image with the best possible quality. The other camera(s) record, for example, the second image area (pixels 513 . . . 1024). For this second image area it is, as a general rule, only necessary to only transmit a few high prioritizing pixel groups, since the pixel groups that have not yet been transmitted can be calculated, among other things, with the aid of the data from the first image area.

An example shall serve to illustrate this. A scene is recorded with a car that carries, for example, an advertising inscription. The car with the advertising inscription is transmitted clearly in the first image area. For the second image area it is then sufficient to transmit only distinctive pixel groups of the image so that the position of the car in image 2 is described clearly. The transmission of the pixel groups for image 2, which would show the advertising inscription, could be dispensed with since it could be reconstructed from the relationship to image 1. This would actually result in a significantly higher compression rate for the second image area than for the first image area.

If one uses more than two image recorders it is possible, for example, to perform precise 3D transmissions. Applications for this exist, among other things, in the film industry or in medical technology for the transmission of 3D image material, such as X-ray and MRI images.)

A significant characteristic of the invention therefore lies in the attainable data reduction in the transmission of the second or additional image. The invention encompasses additional advantages, however, that can be attributed to the feasibility of a 3-dimensional transmission/processing.

A transmission of the camera-properties, for example, such as, e.g., the positions of the cameras relative to each other, employed focal lengths, true speed of the cameras when used in vehicles or on airplanes, etc., can take place within-position values, similar to those described for scene changes in the main application, that are not intended for the actual image data transmission.

To determine properties of the objects represented by the image data, a correlation can be performed of certain image data of the individual perspectives.

The correlated values can be utilized to clearly determine the position, size, speed or deformation of objects in a simple manner. For example, the mechanical deformation of the wings of an airplane can be determined in different flying maneuvers. In the medical field this could be used for examining the movement of different muscle groups and vessels.

The correlated values can be used on the other hand to generate in a simple manner an image or video whose perspective lies in between the actually recorded perspectives (camera positions). An example shall serve to illustrate this. Image 1 is the master camera and is aimed at a vase. Image 2 is recorded by another camera that records the vase at an angle of 20 degrees relative to the master camera. With the aid of the values obtained by correlation and the knowledge of the different camera positions, an image can be created artificially that shows the vase from the angle of view of an imaginary camera, which is located, for example, offset relative to the master camera by only 10 degrees, without that camera actually having to exist. This information could then be used in a simple manner to enrich the natural recordings with artificial information. Application scenarios could include the artificial mixing-in of additional information; in a soccer game, for example, a line that shows whether certain players are in offside positions.

The correlation of image data from different perspectives is based on the following considerations. Prioritizing pixel groups are formed analogous to the method in German patent application No. 102 31 286.9. Corner points of objects, as a rule, result in the highest priority values. If the position of the five highest-prioritized pixel groups relative to one another, for example, is similar to the position of the five highest-prioritized pixel groups of the second camera position relative to one another it can be assumed that the same object was recorded. Individual variations may be ignored as long as the remaining pixel groups display a correspondingly good correlation to each other. From a correspondingly good correlation one can now pinpoint the variations of the same object on the different image arrays from the different cameras down to the pixel. If additional information is now available, such as, e.g., camera positions, common reference points, etc., exact dimensions can be determined by means of simple geometric calculations. In the case of a video transmission, taking into account the temporal component also permits a determination of the speed of the image objects. Applying the prioritized pixel transmission renders the number of necessary correlations significantly smaller than as if one had to correlate all pixels of one image with all pixels of the other image, as it is certainly common with conventional methods. The method described here significantly reduces the computing power required to correlate the image data, so that the presented method can also be used well in mobile units, i.e., units with relatively less computing power.

What is claimed is:

1. A method suitable for the compressed transmission of image data for a three-dimensional representation of scenes and objects,
    (a) wherein each scene or each object is recorded from at least two perspectives;
    (b) method of using a video data transmission according to prioritized pixel transmission,
    (b1) wherein the video data of each image are defined by individual pixel groups,
    (b2) wherein each pixel group has a position value within the positions of an image array and at least one assigned pixel value,
    (b3) wherein the size of the image array is defined by the height h and the width b of a video image, given in pixels,
    (b4) wherein for each pixel group of the successive images a priority value is determined,
    (b5) and wherein the position values and pixel values for pixel groups of the highest priority are transmitted with precedence;
    (c) using a method for transmitting additional data within said method of video data transmission,
    (c1) wherein the additional data, like the video data, are transmitted by means of position values and assigned pixel values,
    (c2) wherein the position values of the additional data are associated with an offset region of the image array,
    (c3) and wherein the offset region contains exclusively position values outside of said image array;
    (d) wherein the data of a first perspective form actual video data and the data of at least one other perspective form said additional data,
    (d1) wherein the position values of the additional data are located in said offset region,
    (d2) and wherein for positions within the image array a higher number of pixel groups is transmitted than for positions in the offset region;
    (e) and wherein at the receiving end, pixel values of pixel groups from the offset region that have not been transmitted are calculated from already transmitted pixel groups of the image array.

2. A method according to claim 1, characterized in that for the perspective transmitted in the image array, pixel groups with a higher priority, as well as pixel groups with a lower priority are transmitted, and for the perspective transmitted in the offset region only pixel groups with a higher priority are transmitted.

3. A method according to claim 1, characterized in that to determine properties of the objects presented by the image data, a correlation of certain image data of individual perspectives is performed.

4. A method according to claim 3, characterized in that from the correlated image data, the position, size, speed or deformation of objects are determined.

5. A method according to claim 3, characterized in that image data for additional perspectives are generated from the correlated image data.

* * * * *